United States Patent
Comstock, II et al.

(10) Patent No.: US 10,209,424 B2
(45) Date of Patent: Feb. 19, 2019

(54) VISUAL DISPLAY BACKLIGHT UNIT

(71) Applicant: Corning Incorporated, Corning, NY (US)

(72) Inventors: Lovell Elgin Comstock, II, Charlestown, NH (US); Thierry Luc Alain Dannoux, Avon (FR); Ying Geng, Painted Post, NY (US); Jacques Gollier, Painted Post, NY (US); Ying Zhang, Horseheads, NY (US)

(73) Assignee: Corning Incorporated, Corning, NY (US)

(*) Notice: Subject to any disclaimer, the term of this patent is extended or adjusted under 35 U.S.C. 154(b) by 125 days.

(21) Appl. No.: 14/591,241

(22) Filed: Jan. 7, 2015

(65) Prior Publication Data
US 2015/0198757 A1 Jul. 16, 2015

Related U.S. Application Data (60) Provisional application No. 61/925,857, filed on Jan. 10, 2014.

(51) Int. Cl.
*F21V 8/00* (2006.01)

(52) U.S. Cl.
CPC .......... *G02B 6/0028* (2013.01); *G02B 6/003* (2013.01); *G02B 6/0088* (2013.01); *G02B 6/005* (2013.01); *G02B 6/0045* (2013.01); *G02B 6/0046* (2013.01); *G02B 6/0058* (2013.01); *G02B 6/0065* (2013.01)

(58) Field of Classification Search
CPC .. G02B 6/0028; G02B 6/0065; G02B 6/0088; G02B 6/002; G02B 6/003; G02B 6/0023; G09F 13/18

USPC ......................................... 362/607, 608, 609
See application file for complete search history.

(56) References Cited

U.S. PATENT DOCUMENTS

| | | | | |
|---|---|---|---|---|
| 5,027,258 A | * | 6/1991 | Schoniger | G02B 6/0023 362/629 |
| 6,481,130 B1 | * | 11/2002 | Wu | F21V 13/04 362/297 |
| 7,087,307 B2 | | 8/2006 | Nagashim et al. | |
| 7,677,783 B2 | * | 3/2010 | Wei | G02B 6/0028 362/610 |

(Continued)

FOREIGN PATENT DOCUMENTS

| | | |
|---|---|---|
| CN | 1595256 A | 3/2005 |
| JP | 2006108606 A | 4/2006 |

(Continued)

OTHER PUBLICATIONS

European Patent Office; International Search Report; dated Apr. 14, 2015; pp. 1-4.

(Continued)

*Primary Examiner* — Zheng Song
(74) *Attorney, Agent, or Firm* — Kevin M. Able (57) ABSTRACT

A backlight unit suitable for use in illuminating a liquid crystal display panel of a display device. The backlight unit comprises a light guide plate, the light guide plate comprising a glass substrate with at least one edge, an intermediate waveguide physically and optically coupled to the at least one edge along a length of the edge, and a light source optically coupled to the intermediate waveguide.

15 Claims, 6 Drawing Sheets

(56) References Cited

U.S. PATENT DOCUMENTS

| | | | |
|---|---|---|---|
| 2003/0016930 A1* | 1/2003 | Inditsky | G02B 6/0011 385/133 |
| 2003/0085642 A1* | 5/2003 | Pelka | B82Y 10/00 313/113 |
| 2006/0062016 A1* | 3/2006 | Dejima | G02B 6/002 362/600 |
| 2006/0072315 A1 | 4/2006 | Han et al. | |
| 2008/0170414 A1* | 7/2008 | Wang | G02B 6/0028 362/612 |
| 2008/0170415 A1 | 7/2008 | Han et al. | |
| 2009/0059621 A1 | 3/2009 | Takahashi et al. | |
| 2010/0003393 A1 | 1/2010 | Torney et al. | |
| 2010/0048085 A1* | 2/2010 | Kayanuma | G02B 6/0018 445/23 |
| 2010/0214786 A1 | 8/2010 | Nichol | 362/296.01 |
| 2010/0253878 A1 | 10/2010 | Lee | |
| 2011/0228559 A1* | 9/2011 | Kinder | G02B 6/0028 362/608 |
| 2011/0242846 A1 | 10/2011 | Park | |
| 2011/0267841 A1* | 11/2011 | Lee | G02B 6/003 362/613 |
| 2011/0286237 A1* | 11/2011 | Tanoue | G02B 6/0016 362/606 |
| 2013/0044514 A1* | 2/2013 | Chang | G02B 6/0028 362/609 |
| 2013/0188393 A1* | 7/2013 | Wu | G02B 6/0011 362/613 |
| 2014/0078772 A1* | 3/2014 | Gaydoul | G02B 6/001 362/555 |
| 2014/0126238 A1* | 5/2014 | Kao | G02B 6/0065 362/608 |
| 2015/0009686 A1 | 1/2015 | Pumyea et al. | |

FOREIGN PATENT DOCUMENTS

| | | |
|---|---|---|
| JP | 2009053377 A | 3/2009 |
| JP | 2013098120 A | 5/2013 |
| TW | 200506456 A | 2/2005 |
| WO | 2013106553 A1 | 7/2013 |

OTHER PUBLICATIONS

Gourlay, J. and Miller, I. (2009), 48.1: *Distinguished Paper:* Low-Cost Large-Area LED Backlight. SID Symposium Digest of Technical Papers, 40: 713-715. doi: 10.1889/1.3256885.

GeunHyung Kim, A PMMA composite as an optical diffuser in a liquid crystal display backlighting unit (BLU), European Polymer Journal, vol. 41, Issue 8, Aug. 2005, pp. 1729-1737, ISSN 0014-3057.

Taiwan Search Report TW104100780 dated Feb. 22, 2018; 1 Page; Taiwan Patent Office.

English Translation of JP2016545980 Office Action dated Aug. 28, 2018, Japan Patent Office, 4 pgs.

English Translation of CN201580013142.4 First Office Action dated Sep. 30, 2018, China Patent Office, 13 pgs.

* cited by examiner

VISUAL DISPLAY BACKLIGHT UNIT

This application claims the benefit of priority under 35 U.S.C. § 119 of U.S. Provisional Application No. 61/925,857 filed on Jan. 10, 2014, the content of which is relied upon and incorporated herein by reference in its entirety.

BACKGROUND

Field

The present invention relates generally to a liquid crystal display device, and more particularly to a backlight unit configured to illuminate a display panel of the display device.

Technical Background

In liquid crystal displays (LCD's), the backlight unit usually contains a light guide plate (LGP) coupled at the edge thereof to a series of white light emitting diodes (LED's). The LGP is usually made of a plastic material, such as Poly(methyl methacrylate), PMMA, a transparent thermoplastic, with a thickness of about 400 micrometers or more for hand held devices. In some applications, there is a desire to minimize the thickness of the entire LCD stack, and using a thinner LGP presents significant advantages. The problem, however, is that the typical size of LED's is, for instance, 1×0.3 millimeters (mm), and coupling light from the LED's into a waveguide with a thickness of about 100 micrometers presents challenges.

Also, for large size panels (e.g. 60 inches, 152.4 centimeters), the use of PMMA is problematic, since PMMA absorbs moisture that can create significant elongation. Thus, there is a need to replace PMMA with a thin, dimensionally stable material. However, for large panels, very large area LED's (in the order of 2×2 millimeters to 3×3 millimeters) are needed so that there is a need to couple LEDs with sizes larger than the thickness of the waveguide.

In other applications, there may be a desire to minimize the size of the bezel. Current backlight designs present other limitations. For example, there is also a need for room to heat sinking the LED's, as well as driving circuits to drive them. Also, close to the LED emission points, the optical power density inside the LGP is non-homogeneous, making the first few millimeters of the LGP closest to the LED's to be unusable.

For at least these reasons, there is interest in an optical system that can transform the light emitted by a large area LED into a waveguide thinner than the emission area.

SUMMARY

The present disclosure describes an apparatus comprising coupling a light source into a first intermediate waveguide (IWG) such that the emission area of the light source can be included in the cross section of the IWG. Light is then propagated over the length of the IWG. The LGP is optically coupled to the IWG so that light leaks from the IWG into the LGP over the propagation distance L. Contact between the IWG and the LGP, optionally through an adhesive, as well as the length of the IWG is optimized to obtain maximum coupling efficiency between the IWG and the LGP.

Accordingly, an apparatus is disclosed comprising a backlight unit including a light guide plate, the light guide plate comprising a glass substrate with at least one edge, an intermediate waveguide physically and optically coupled to the at least one edge along a length of the edge, and a light source optically coupled to the intermediate waveguide. The light guide plate may comprise less than 60 ppm iron (Fe). A thickness of the light guide plate is equal to or less than about 1.5 millimeters, such as equal to or less than 1.2 millimeters. The intermediate waveguide is physically and optically coupled to the light guide plate with an adhesive such as a silicone adhesive or an epoxy. The adhesive may be index-matched to the IWG and/or the LGP. In some embodiments the intermediate waveguide comprises a groove or channel in a surface thereof, and the edge of the light guide plate is positioned within the channel. In certain embodiments the intermediate waveguide is physically and optically coupled to a major surface of the glass substrate.

A plurality of individual light sources may be optically coupled to the intermediate waveguide. As used herein, optically coupled refers to light propagating in one medium, such as an intermediate waveguide, being transferred into another medium, such as a light guide plate.

The backlight unit may comprise a plurality of intermediate waveguides physically and optically coupled to the light guide plate.

The apparatus may further comprise a liquid crystal display panel positioned adjacent to the back light unit.

In some embodiments the intermediate waveguide may be an elongated waveguide comprising a long axis, and the intermediate waveguide comprises a taper along the long axis. For example, the intermediate waveguide may be tapered in a dimension perpendicular to a plane of the light guide plate. In other examples the intermediate waveguide may be tapered in a dimension parallel to a plane of the light guide plate. In certain other examples the intermediate waveguide can be tapered in multiple dimensions (direction or axis).

In some embodiments the light source is optically coupled directly to the light guide plate so that light is coupled simultaneously into the light guide plate and the intermediate light guide from the light source.

It is to be understood that both the foregoing general description and the following detailed description present embodiments of the present disclosure, and are intended to provide an overview or framework for understanding the nature and character of the embodiments as they are claimed. The accompanying drawings are included to provide a further understanding of the embodiments, and are incorporated into and constitute a part of this specification. The drawings illustrate various embodiments of the present disclosure, and together with the description serve to explain the principles and operations of the embodiments.

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts.

Backlight units (BLUs) are typically employed as light sources for optical display devices in which the display panel itself does not generate light. This can be illustrated by comparing an organic light emitting diode display panel, wherein the individual organic light emitting diodes each generate light, to a liquid crystal display panel, wherein the liquid crystal material of the display panel only moderates light originating from an outside source. A backlight unit, then, is positioned behind a display panel relative to the viewer position. Light from the backlight unit is passed through the liquid crystal display (LCD) panel, and the liquid crystal material at each pixel position is modified by an electrical signal to either allow the impinging light from the backlight unit to pass through the display panel at the pixel location or to be stopped. Pixel locations may be subdivided into sub-pixels, wherein light that may pass through a sub-pixel location can be further modified by passing the light from the backlight unit through a color filter.

Backlight units for LCD devices have in the past relied on the incorporation of cold cathode fluorescent light sources. More recently, light emitting diodes (LEDs) have been employed as the light source within the backlight unit. The LEDs may be arranged along one or more edges of an optically "leaky" light guide plate. Light from the LEDs is guided within and across the light guide plate and caused to scatter along the guided propagation path of the light so that a relatively uniform amount of light is projected from the light guide plate in a direction toward the LCD panel. By arranging LEDs along one or more edges of a light guide plate rather than directly behind the LCD panel, as was the practice with cold cathode fluorescent illumination, LCD display devices can be made significantly thinner than earlier generations of devices, as demonstrated by the commercial success of such thin "LED" televisions. Moreover, the use of LEDs, which can be manufactured to very small dimensions, allows a shrinking of the width of the bezel surrounding the display.

Nevertheless, there is a desire to produce increasingly thinner LCD devices, particularly for small hand-held devices, and for wearable display electronics such as wrist worn devices, but also for large format televisions. One approach has been to decrease the thickness of the substrates comprising the liquid crystal panel. Another approach has been to decrease the air gap between the LCD panel and the cover panel, typically a glass substrate positioned in front of the liquid crystal panel to provide damage protection to the liquid crystal panel.

An additional way to decrease overall thickness of the display device is by reducing the thickness of the backlight unit, and in particular the light guide plate, made possible by the recent commercial introduction of very thin, high optical quality glass sheets having a thickness equal to or less than about 100 micrometers (microns, μm). Nevertheless, the extreme thinness of the glass makes the coupling of light into the light guide plate, and the uniform distribution of light along a guide direction of the light, particularly difficult. In addition, the plastic (PMMA) that is normally used as the LGP is problematic for large (>50 inch diagonal, 127 centimeters) displays. Moisture absorption by the LGP results in very large dilations of the LGP. This affects the air gap between the light sources and the LGP. As a result, LGP homogeneity and image brightness produced by the display device can vary over time. Thus, there is significant push from customers to replace PMMA with glass. For at least the reasons above, thinner glass is preferred, but on the other hand, the size of the LED's as light sources ranges from about 2 millimeters to about 3 millimeters and may couple light inefficiently.

U.S. Patent Publication 2010/0214786, published on Aug. 26, 2010 to Nichol describes, inter alia, a flexible translucent sheet folded to have portions of its bounding edge closely situated in an overlapping relationship, and these overlapping portions are illuminated by a light source. The illumination is transmitted through the interior of the sheet to any unfolded area of the sheet, which may bear emission areas that are treated so that light emits from the sheet at these areas. Some embodiments have a series of legs cut into one edge of the sheet, and the legs are then bundled in a stacked relationship, with a light source providing light input into the bundle.

While structures such as described by Nichol can, in theory, achieve excellent coupling efficiencies, they may be impractical, since they require a complex 3D structure, and in some embodiments surfaces require coating with a reflective coating.

Figure 1A:
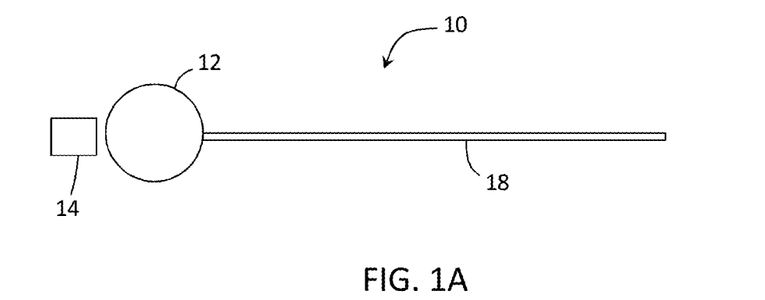
FIG. 1A is a side view of a backlight unit according to an embodiment of the present disclosure.
Figure 1B:
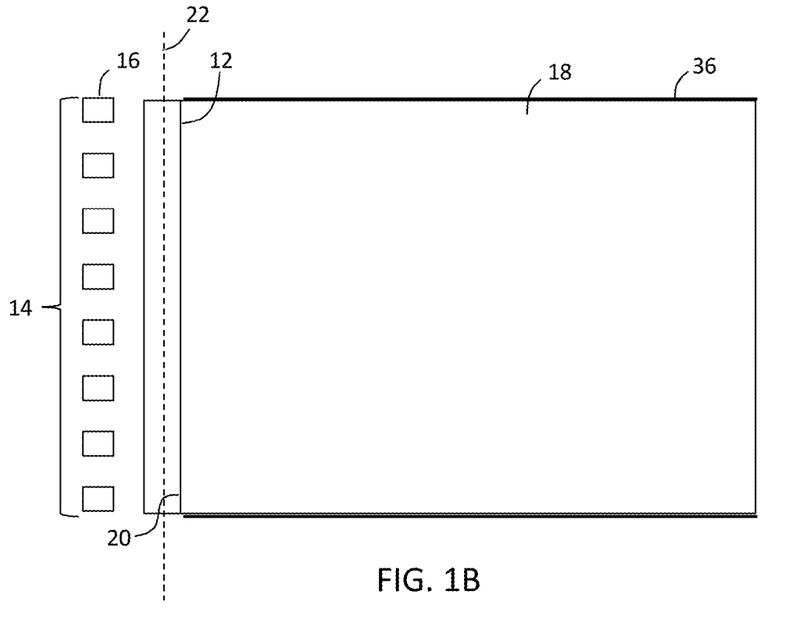
FIG. 1B is a top view of the backlight unit of FIG. 1A.

Accordingly, as described herein and depicted in FIGS. 1A and 1B, in one embodiment, a backlight unit 10 is presented that utilizes one or more large cross section, elongated intermediate waveguides (IWG) 12. A light source 14, which may include one or more individual light emitters 16, such as one or more LEDs, is optically coupled to each IWG 12 by proximity coupling. To optimize the optical coupling, the cross section of IWG 12 should be at least equal to the cross section of a light emitter 16. A thin glass light guide plate (LGP) 18 is then optically coupled to IWG 12 using, for example, a refractive index matching material. Since there is optical coupling between IWG 12 and LGP 18, light propagating in IWG 12 leaks into LGP 18 and propagates in a guide direction across LGP 18. To provide good optical clarity without significant tinting (coloring), the glass should contain less than 60 parts per million (ppm) concentration iron.

In one embodiment, as illustrated in FIG. 1B, an edge 20 of LGP 18 may be parallel to a longitudinal axis 22 of IWG 12. IWG 12 may be formed, for example, as a rod and LGP 18 is optically coupled along a length of the rod. While the following embodiments are described and shown as a rod with a circular cross section, other cross sectional shapes, such as an ellipse, rectangle or any other geometric shape, can work in a similar manner and are contemplated herein.

Figure 2:
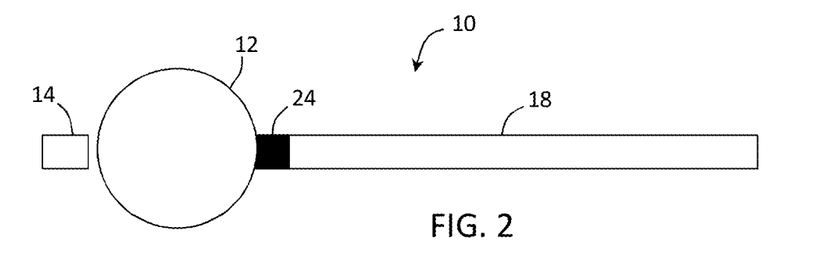
FIG. 2 is a side view of a backlight unit according to an embodiment of the present disclosure showing the light guide plate (LGP) physically coupled to the intermediate waveguide (IWG)

In some embodiments, such as shown in FIG. 2, IWG 12 may be physically connected to LGP 18. For example, IWG 12 may be connected to LGP 18 by an optical adhesive 24, wherein the adhesive forms a joint between IWG 12 and LGP 18. Such a joint can be formed using, for example, an epoxy or a silicone adhesive. The amount of light leaking from IWG 12 along the length of IWG 12, and therefore being optically coupled into LGP 18, can be modified by adjusting the local pressure between IWG 12 and LGP 18. Thus, in some embodiments, IWG may not be a straight rod (i.e. IWG may include a non-linear longitudinal axis 22). The coupling efficiency between IWG 12 and LGP 18 is dependent on at least the length of the IWG rod, its diameter and the contact area between IWG 12, LGP 18 and/or adhesive 24.

Figure 3A:
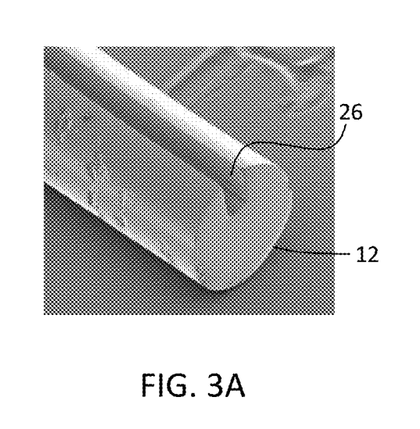
FIG. 3A is a photomicrograph of an IWG comprising a groove formed in a surface thereof.

Since just an epoxy joint between IWG 12 and LGP 18 is expected to be somewhat brittle, several methods of accomplishing the joining may be employed. In one such method, illustrated in FIGS. 3A and 3B, a groove 26 (channel) is formed in the IWG that comprises a width that is slightly larger than the thickness of the edge of the LGP to which the IWG will be joined. FIG. 3A is an electron microscope image of such an IWG. Adhesive 24, such as a refractive index matching epoxy, is then spread within groove 26 and/or along edge 20 of LGP 18, and the edge is positioned within the groove. Excess adhesive that is pushed from the groove by the joining can be removed, such as by wiping.

Figure 4:
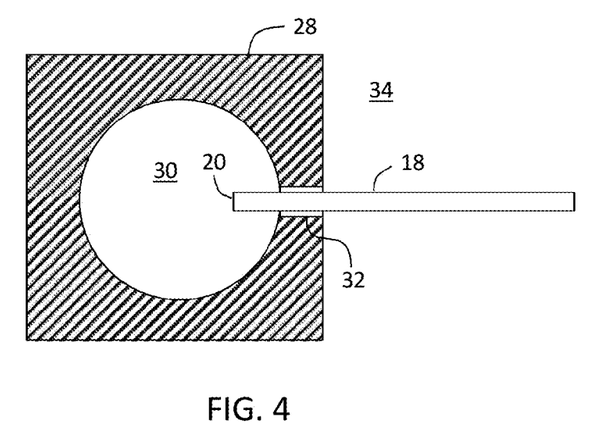
FIG. 4 is a cross sectional side view of a mold, and an LGP inserted into a slot of the mold, for forming an IWG bonded to the LGP.

In another approach, shown in FIG. 4, a mold 28 of an IWG, including hollow, longitudinally-extending interior space 30 and slit 32 formed in a side of the mold that intersects the hollow interior space and connects the hollow interior space with a region 34 outside the mold, is produced. LGP 18 is inserted into the slit such that edge 20 extends a predetermined distance into the hollow interior space, and a plastic material, such as PMMA, or a refractive index matched epoxy, is injected into the mold, such as from an end of the mold. The plastic material (or refractive index-matched epoxy) is then cured in a manner appropriate to the material, and the mold thereafter removed.

Figure 5:
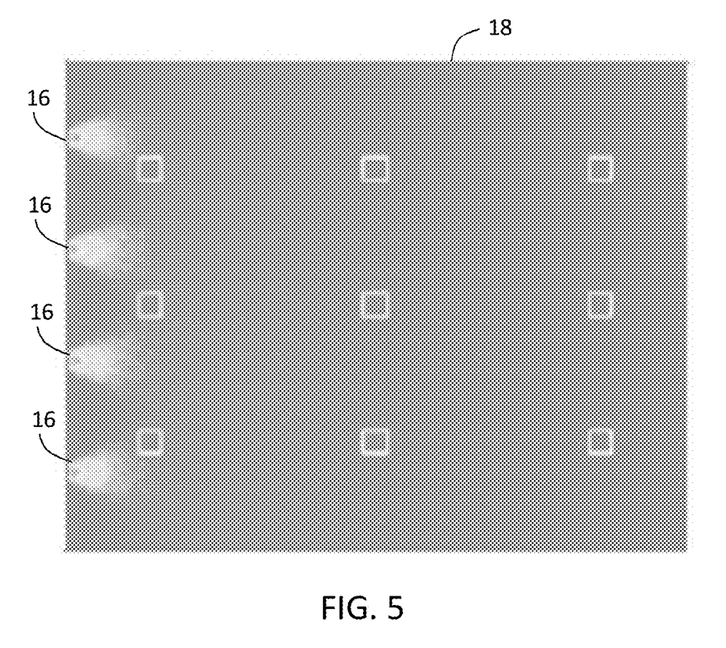
FIG. 5 is top view of an LGP illuminated by multiple LEDS, and showing a non-uniform illumination pattern within the LGP.

One of the problems in conventional backlight units that use multiple light sources (e.g. LEDs) is the formation of so-called "hot spots", as depicted in FIG. 5. Such hotspots occur because, very close to an individual light source, the concentration of light is very high. Consequently, regions of the LGP close to the individual light sources, for example within the first few millimeters of the LGP, are not usable, as the illumination is not sufficiently uniform. This, in general, requires the use of large bezels as to hide the first portion of the LGP near the light sources.

Accordingly, embodiments of the present disclosure include the use of a single linear light source (IWG 12) such that hot spots are not formed, allowing displays with very narrow bezels.

In some embodiments, since light can escape the IWG at a high angle, a reflective material 36, such as vapor-deposited aluminum, can be applied to the surfaces of edges which are not coupled to IWG 12, such as the edges perpendicular to IWG 12, as illustrated in FIG. 1B.

Figure 3B:
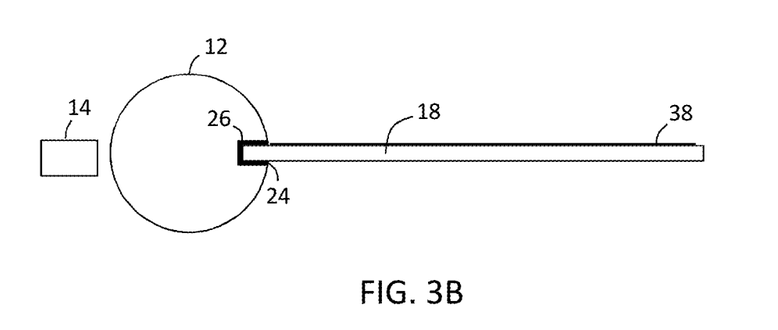
FIG. 3B is a side view of a backlight unit according to an embodiment of the present disclosure illustrating an edge of a LGP bonded into a groove in an IWG.
Figure 6:
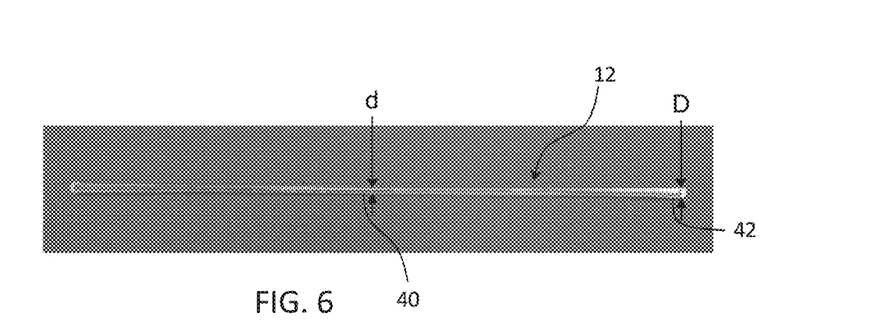
FIG. 6 is a photograph of an IWG having a diameter that varies along the length of the IWG such that a middle portion of the IGP is thinner than an end portion of the IWG.

Since the light is leaking from the IWG, the intensity of the light propagating through IWG 12 decreases as the distance between the light source and a position within the IWG increases. That is, the intensity of the light decreases with distance from the light source. As a result, the light available to be coupled into LGP 18 can vary along the length of IWG 12. Thus, in some embodiments it may be necessary to vary the spatial density of light extraction features within or on the LGP, such as the spatial density of scattering features in a scattering layer 38 on a surface of LGP 18 (FIG. 3B). In other embodiments, the cross section of the IWG can be varied, since the extraction efficiency between IWG 12 and LGP 18 increases inversely with decreasing IWG cross section. Accordingly, in certain embodiments, as shown in FIG. 6, IWG 12 may have a middle portion 40 with a smaller diameter "d" than a diameter "D" of the end portions 42. FIG. 6 is a photograph of such an IWG. The narrower middle portion extracts more light around the central region of the rod. It should be noted that the narrower portion could be positioned in another location, and is not confined to the middle.

Embodiments described herein are well adapted for small size displays, such as in hand held devices and wearable electronics, and enable very thin glass for the LGP, for example having a thickness equal to or less than 1.5 mm, equal to or less than 1 mm, equal to or less than 500 µm, equal to or less than 300 µm, equal to or less than 100 µm, and in some instances equal to or less than 50 µm. The typical geometry to couple a 1 millimeter×1 millimeter LED into a 200 micrometer thick LGP is a rod of about 1.5 millimeter in diameter and with a length of about 100 millimeter. Modeling indicates that the coupling into the LGP from such an IWG is on the order of 85%. It should be recognized that the dimensions of the IWG, and the LGP, will be determined by the dimensions of the display device. It will be readily apparent that the dimension of a backlight unit for a large-screen television will be different that the dimension of a small hand held device.

Figure 7:
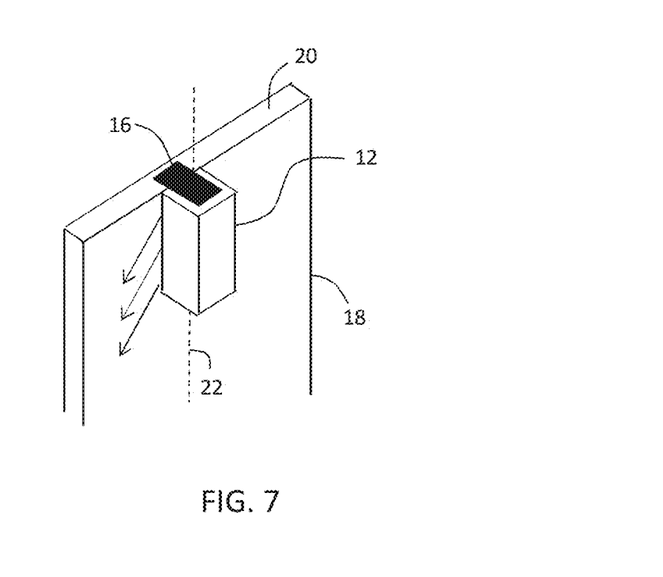
FIG. 7 is a perspective view of a backlight unit wherein a longitudinal axis of the IWG is perpendicular to the edge into which light is coupled.

In another embodiment, shown in FIG. 7, an IWG is illustrated including a longitudinal axis 22 that is perpendicular to an edge of the LGP. For example, the IWG structure can be over-molded directly on the LGP. Another option that may be used comprises injection molding a light coupling IWG to the LGP. The IWG would then be coupled to an LED on one side and to the LGP on its other side. The configuration illustrated in FIG. 7 places the light source partly against an edge of LGP 18 such that part of the light produced by the light source is directly coupled into the LGP without needing to go through the IWG. Additionally, the surface of the IWG in contact with the IWG can be much larger than in the preceding edge-mounted parallel IWGs, meaning a much shorter IWG can be employed to get the same level of coupling obtained with the parallel configuration.

Figure 8A:
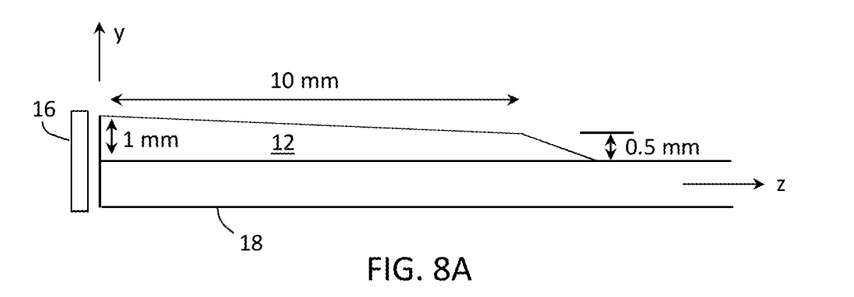
FIGS. 8A-8C are orthogonal views of example dimensions for a IWG coupled to an LGP wherein a long axis of the intermediate light guide is perpendicular to the prximate edge of the LGP.
Figure 8B:
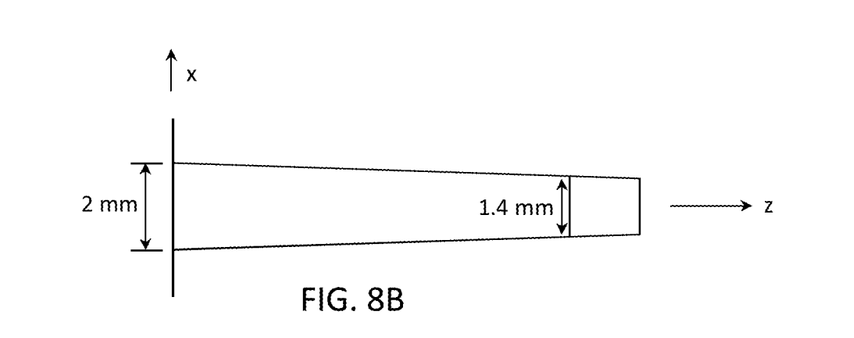
Figure 8C:
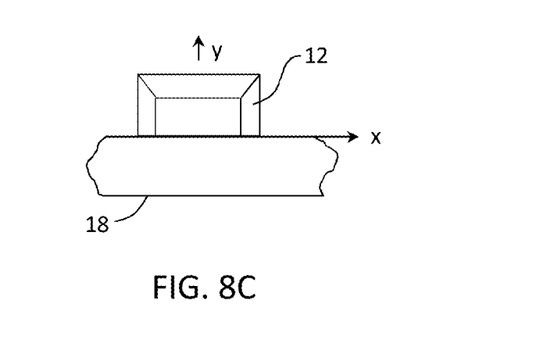

FIGS. 8A, 8B and 8C show orthogonal views of an example geometry of an IWG resulting from optical design optimization. Mathematical simulations of the configuration of FIGS. 8A-8C indicate that about 90% of a 2 millimeter×2 millimeter LED can be coupled to a 1 millimeter thick LGP. In that case, the IWG may be tapered to increase the spatial rate at which the light leaks into the LGP. That is, increase the amount of light per unit length that can be extracted from the IWG into the LGP. As shown in FIGS. 8A-8C, the IWG can be tapered in multiple dimensions. For example, the IWG in FIGS. 8A-8C is tapered in a height direction (above the plane of the LGP, the "y" axis in FIG. 8A) and in a width direction (parallel with the plane of the LGP, the "x" direction in FIG. 8B).

Figure 9:
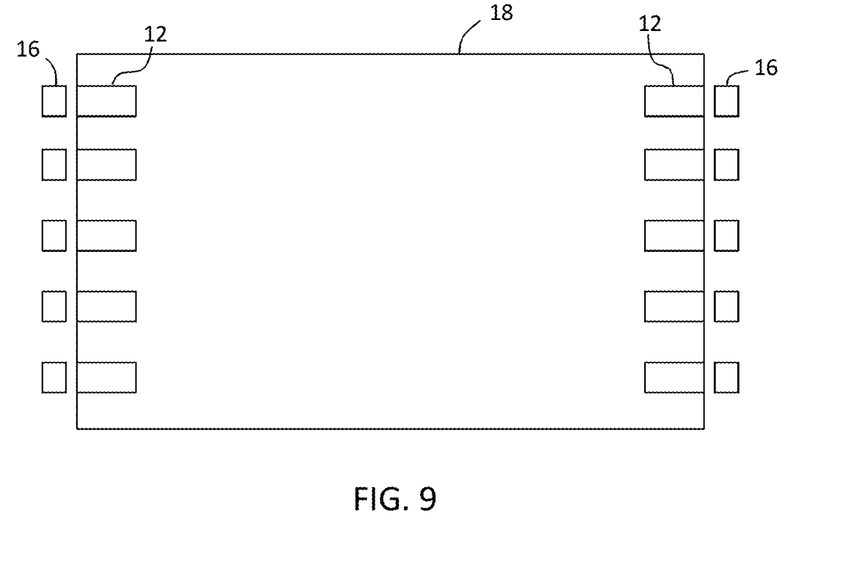
FIG. 9 is a top view of a backlight unit comprising a plurality of IWGs coupled to a plurality of edges of an LGP such that the long axis of the IWGs are perpendicular to the proximate edge.

FIG. 9 illustrates a plurality of perpendicular IWG 12's coupled to a plurality of edges of an LGP, e.g. opposing edges. That is, the IWGs are each perpendicular to the proximate edge of the LGP, but parallel to each other. Thus, as shown in FIG. 9, a plurality of perpendicular IWGs are physically and optically coupled to a first edge of an LGP, and a plurality of perpendicular IWGs are physically and optically coupled to an opposing second edge of the LGP that is parallel with the first edge.

It will be apparent to those skilled in the art that various modifications and variations can be made to embodiments of the present disclosure without departing from the spirit and scope of the disclosure. Thus it is intended that the present disclosure cover the modifications and variations of such embodiments provided they come within the scope of the appended claims and their equivalents.

What is claimed is:

1. An apparatus comprising:
   a liquid crystal display panel;
   a backlight unit positioned adjacent the liquid crystal display panel, the backlight unit including:
      a light guide plate comprising a first major surface, a second major surface, and a flat input edge defined therebetween;
      an intermediate waveguide comprising a longitudinal axis extending parallel to the input edge, a circular cross-section taken perpendicular to the longitudinal axis, and a channel extending along the longitudinal axis, the flat input edge of the light guide plate positioned within the channel along a length of the input edge, wherein a flat surface of the channel faces the flat input edge of the light guide plate and the circular cross-section of the intermediate waveguide is smaller at a middle portion of the intermediate waveguide than at an end portion of the intermediate waveguide; and
      a light source extending along the longitudinal axis of the intermediate waveguide and optically coupled to an input side of the intermediate waveguide.

2. The apparatus according to claim 1, wherein a thickness of the light guide plate is equal to or less than about 1.2 mm.

3. The apparatus according to claim 1, wherein the intermediate waveguide is physically coupled to the flat input edge of the light guide plate with an adhesive.

4. The apparatus according to claim 1, wherein the light source comprises a plurality of light emitters optically coupled to the input side of the intermediate waveguide.

5. The apparatus according to claim 1, wherein the light guide plate comprises less than 60 ppm iron.

6. The apparatus according to claim 1, wherein the length of the flat input edge of the light guide plate defines an entire length of the light guide plate.

7. The apparatus according to claim 1, wherein the light guide plate comprises glass.

8. An apparatus comprising:
   a liquid crystal display panel;
   a backlight unit positioned adjacent the backlight unit, the backlight unit including:
      a light guide plate comprising a first major surface, a second major surface, and an input edge defined therebetween;
      an intermediate waveguide comprising a longitudinal axis extending parallel to the input edge, a circular cross-section taken perpendicular to the longitudinal axis, wherein the circular cross-section varies along the longitudinal axis of the intermediate waveguide, and a channel extending along the longitudinal axis and recessed into the circular cross-section, the input edge of the light guide plate positioned within the channel along a length of the input edge and wherein the circular cross-section of the intermediate waveguide is smaller at a middle portion of the intermediate waveguide than at an end portion of the intermediate waveguide; and
      a light source extending along the longitudinal axis of the intermediate waveguide and optically coupled to an elongated input side of the intermediate waveguide, the elongated input side extending along a length of the channel.

9. The apparatus of claim 8, wherein the elongated input side is diametrically opposed to the channel of the intermediate waveguide.

10. The apparatus according to claim 8, wherein a thickness of the light guide plate is equal to or less than about 1.2 mm.

11. The apparatus according to claim 8, wherein the intermediate waveguide is physically coupled to the input edge of the light guide plate with an adhesive.

12. The apparatus according to claim 8, wherein the light source comprises a plurality of light emitters optically coupled to the elongated input side of the intermediate waveguide.

13. The apparatus according to claim 8, wherein the light guide plate comprises less than 60 ppm iron.

14. The apparatus according to claim 8, wherein the length of the input edge of the light guide plate defines an entire length of the light guide plate.

15. The apparatus according to claim 8, wherein the light guide plate comprises glass.

* * * * *